ARM SUPPORT

Original Filed June 18, 1964 3 Sheets-Sheet 1

INVENTOR.
JOHN L. NAUGHTON
BY Rudolph R. Rowell
ATTORNEY.

ARM SUPPORT
Original Filed June 18, 1964 3 Sheets-Sheet 2
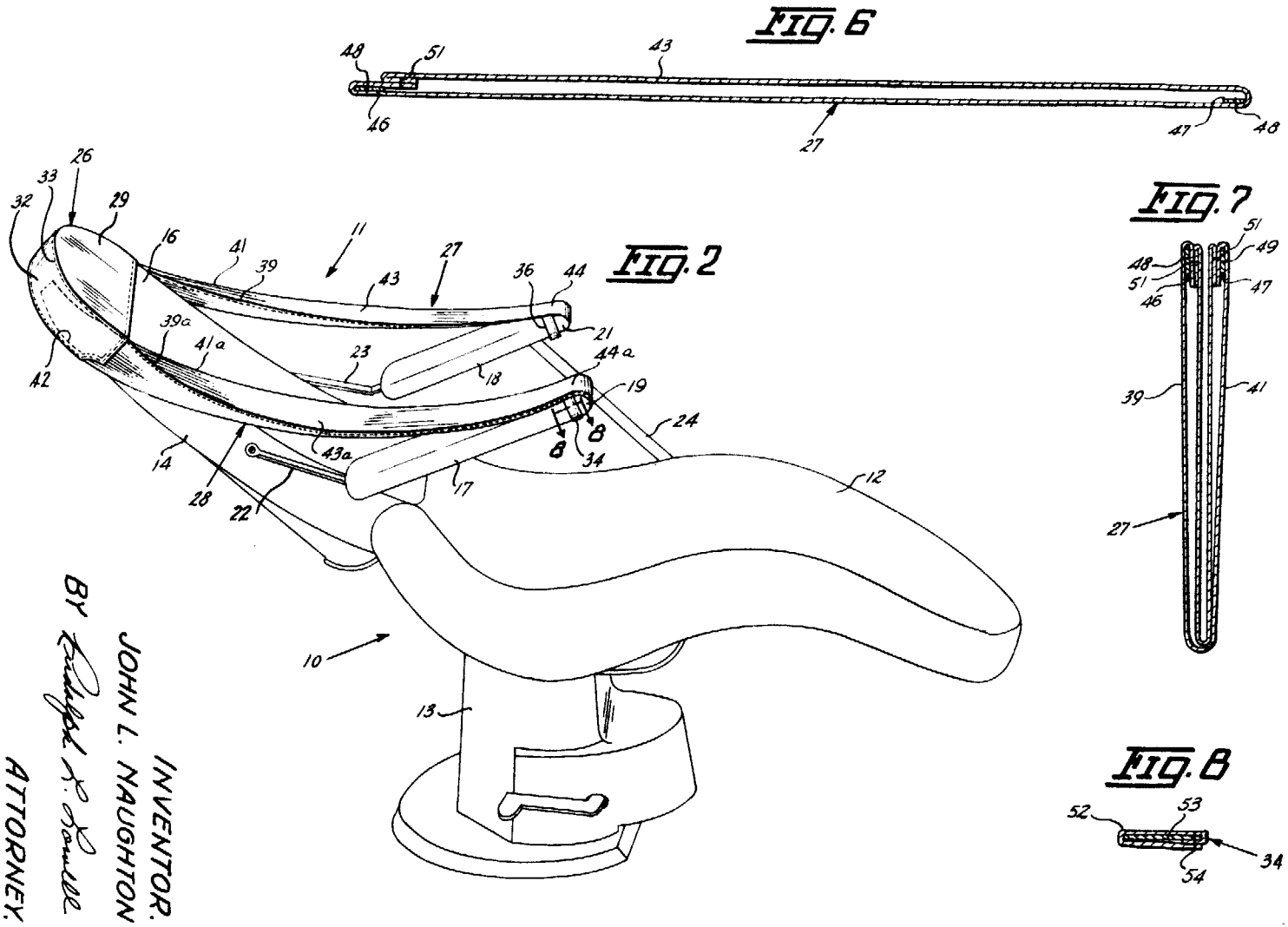
INVENTOR.
JOHN L. NAUGHTON
BY Rudolph R. Lowell
ATTORNEY.

INVENTOR.
JOHN L. NAUGHTON
BY Rudolph R. Lowell
ATTORNEY.

United States Patent Office

Re. 26,241
Reissued Aug. 1, 1967

26,241
ARM SUPPORT

John L. Naughton, Des Moines, Iowa, assignor to Den-Tal-Ez Chair Manufacturing Co., Des Moines, Iowa, a corporation of Iowa Original No. 3,223,448, dated Dec. 14, 1965, Ser. No. 376,041, June 18, 1964. Application for reissue Jan. 4, 1966, Ser. No. 523,834
8 Claims. (Cl. 297—418)

Matter enclosed in heavy brackets [ ] appears in the original patent but forms no part of this reissue specification; matter printed in italics indicates the additions made by reissue.

This invention relates to auxiliary apparatus for a chair and more particularly to a patient arm support for a contour dental chair.

It is the object of the invention to provide improved patient arm rests for a contour dental chair.

Another object of the invention is to provide a flexible arm support attachable to a chair for holding the arms and shoulders of a person seated in a chair.

A further object of the invention is to provide a chair arm support having flexible arm rests which do not interfere with a person getting into or out of the chair.

An additional object of the invention is to provide a removable arm support for a contour dental chair which is sturdy in construction, economical in cost and reliable and efficient in use.

These and other objects and advantages of the invention will become apparent upon reference to the following description and the accompanying drawing, wherein:

FIG. 2 is a view similar to FIG. 1 showing the contour chair in the recline position;

FIG. 6 is an enlarged sectional view taken along the line 6—6 of FIG. 1;

FIG. 7 is an enlarged sectional view taken along the line 7—7 of FIG. 2; and

FIG. 8 is an enlarged sectional view taken along the line 8—8 of FIG. 2.

Figure 1:
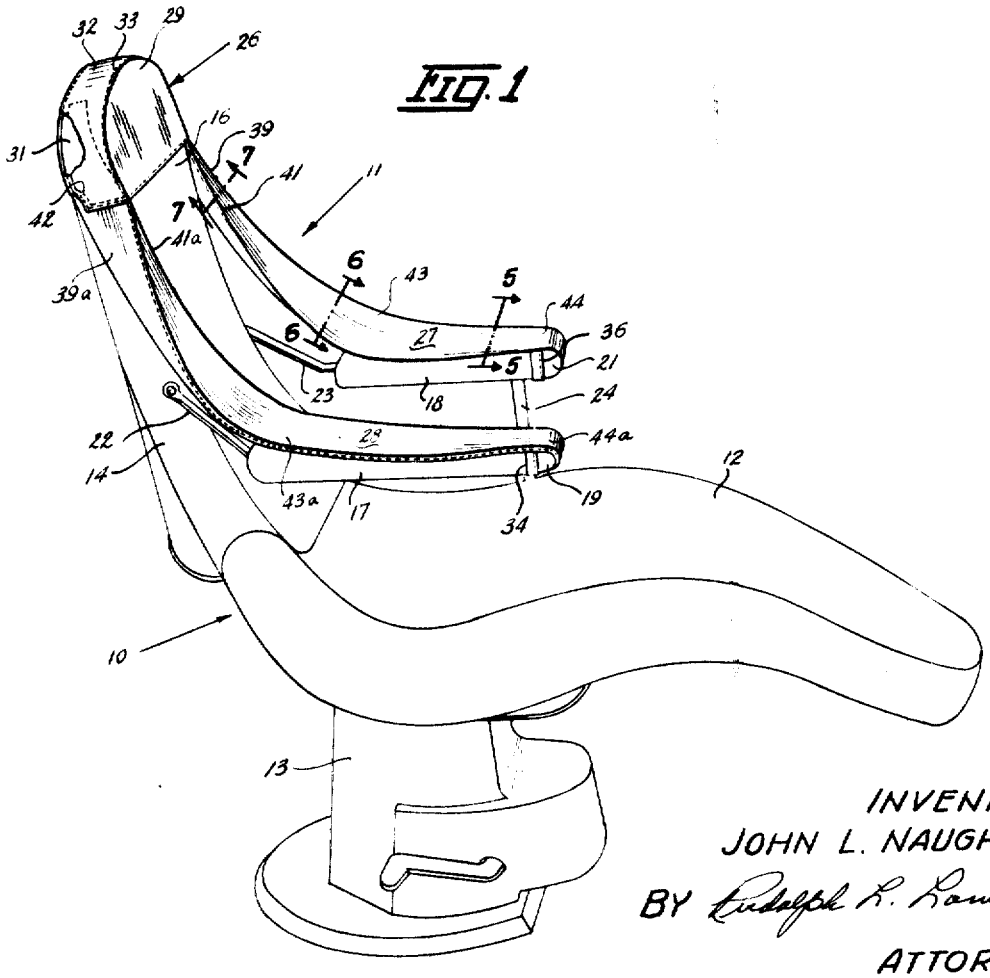
FIG. 1 is a perspective view of a contour chair in an upright position equipped with the arm support of this invention.

Referring to the drawing, there is shown in FIGS. 1 and 2 a contour dental chair 10 equipped with the patient arm support indicated generally at 11 of this invention. The chair 10 comprises a curved seat and leg unit 12 carried on an upright support 13. A back rest unit 14 is pivotally connected at its lower end to the rear section of the seat and leg unit 12. The back rest unit 14 pivots about a horizontal axis which extends transversely of the chair and is movable to an upright position as shown in FIG. 1 and to a reclined or Trendelenburg position as shown in FIG. 2 by a power mechanism (not shown) mounted within the seat and leg unit 12. The top or head end 16 of the back rest unit 14 is semicircular in shape. The design contour of the seat and leg unit 12 and the back rest unit 14 of the chair is disclosed in U.S. Des. Patent No. 186,104 issued to John L. Naughton, September 15, 1959.

Positioned above and on opposite sides of the seat and leg unit 12 are a pair of forwardly extended arms 17 and 18 of a generally rectangular shape having forward ends 19 and 21, respectively. Rods 22 and 23 project rearwardly and upwardly from the rear ends of the arms 17 and 18, respectively, and pivotally mount the arms on the opposite sides of the back rest unit 14. An upright support 24 is pivotally connected to the seat and leg unit 12 and to the arm 18 and functions to control the position of the arms 18 and 19 with respect to the back rest unit 14 on pivotal movement of the back rest unit 14 with respect to the seat and leg unit 12. The mechanical construction of the chair 10 is disclosed in applicant's co-pending U.S. patent application Serial No. 292,803 filed July 1, 1963.

The patient arm support 11 is made from leather-like upholstery material, such as Naugahyde, and comprises a cap member 26 and a pair of flexible arm members 27 and 28 secured to opposite sides of the cap member. In use, the arm members 27 and 28 function as slings or rests for the arms and shoulders of a patient seated in the chair 10.

Figure 3:
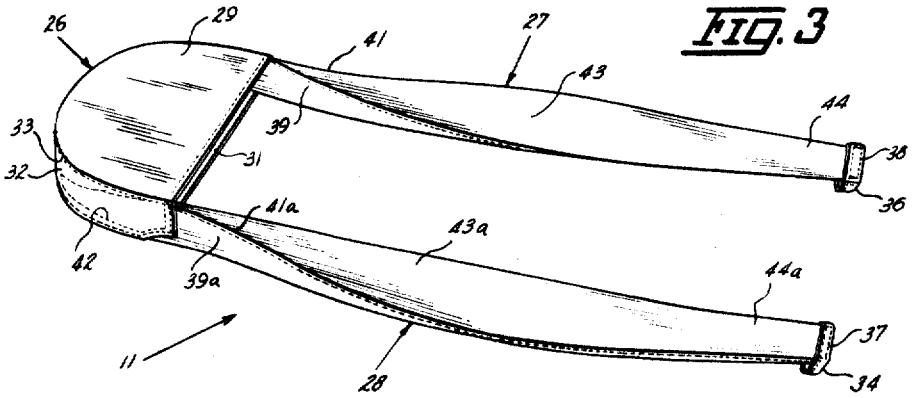
FIG. 3 is a perspective view of the arm support of this invention.

As shown in FIGS. 1 and 3, the cap member 26 has semicircular-shaped front and back sections 29 and 31. A side strip 32 having a width substantially equal to the thickness of the head end 16 of the back rest 14 is secured by stitches 33 to the curved peripheral sections of the front and back sections 29 and 31 thereby forming a semicircular-shaped pocket for accommodating the semicircular head end 16. Referring to FIGS. 1 and 2, when the cap member 26 is positioned over the head end 16 the arm members 27 and 28 are extended forwardly and downwardly above the chair arms 18 and 17, respectively. Loops 34 and 36 secured to the forward ends of the arm members 28 and 27 are positioned about the forward chair arm ends 19 and 21 to connect the arm members 28 and 27 to the chair arms 17 and 18. As shown in FIG. 3, stitches 37 and 38 fasten the loops 34 and 36 to the arm members 28 and 27, respectively.

Figure 5:
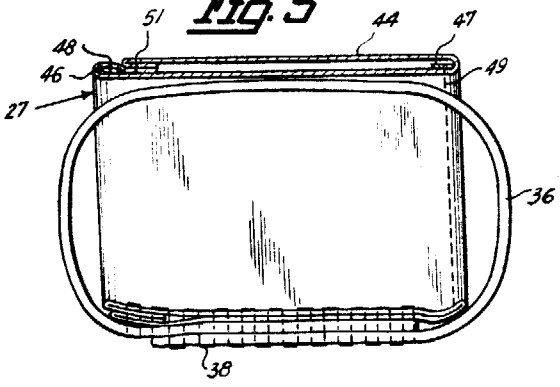
FIG. 5 is an enlarged sectional view taken along the line 5—5 of FIG. 1.

Referring to FIG. 5, the end sections of the loop 36 are positioned in an overlapped relation with the stitches 38 securing the end sections to each other and to the arm member 27. The loop 34 is secured in a similar manner to the arm member 28.

Since the arm members 27 and 28 are identical in construction the following description is limited to the arm member 27 with corresponding structure of the arm member 28 having identical reference numbers with the suffix a. As shown in FIG. 3, the upper end section of the arm member 27 is longitudinally folded in a side-by-side relation forming upright sides 39 and 41 which are positioned adjacent the inside of the side strip 32 of the cap member 26 and secured thereto with stitches 42. The cap member 26 holds the upper end section of the arm member 27 in an upright plane. From the upright sides 39 and 41 the arm member 27 increases in width and gradually changes in shape to a relatively flat horizontal central section 43. From the central section 43 the arm member 27 remains horizontal but decreases in width toward the forward end section 44.

Figure 4:
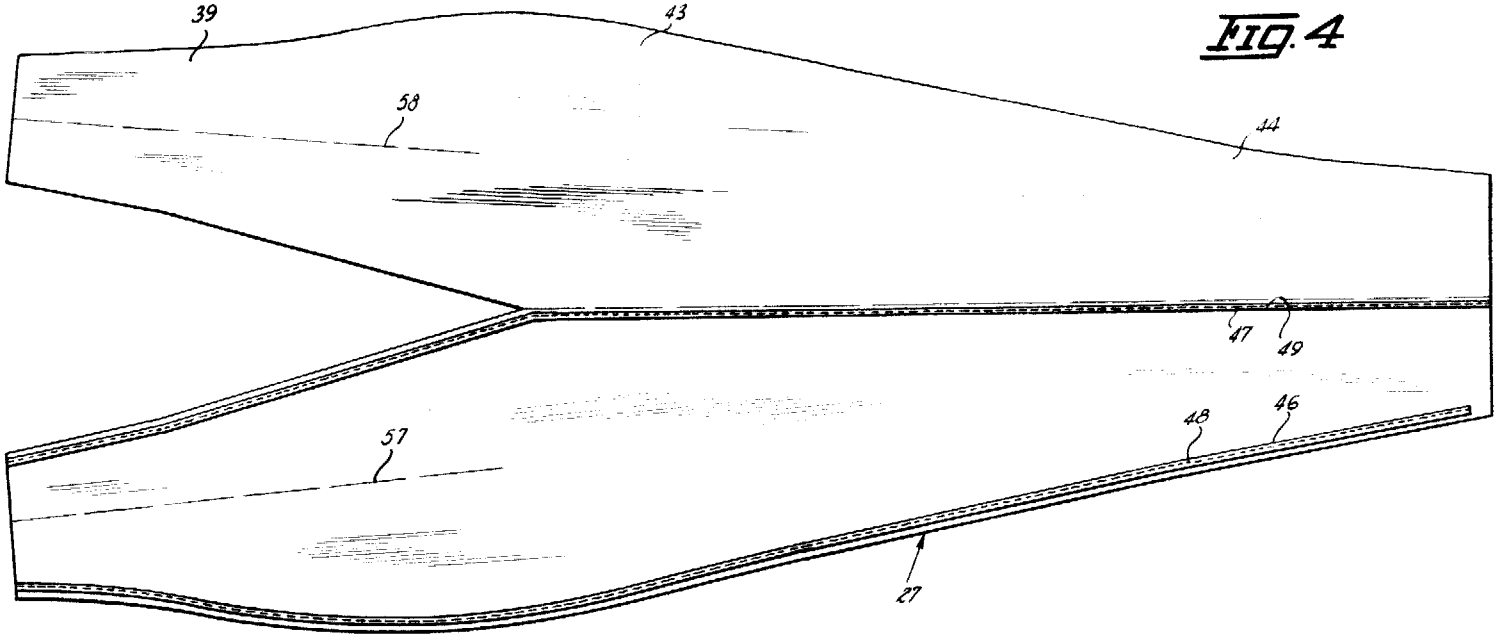
FIG. 4 is an enlarged plan view of a layout blank of material of one of the arms of the arm support of this invention.

The layout blank for the arm member 27 is shown in FIG. 4 and comprises a generally Y-shape flat upholstery material reinforced along its edges with strip material 46 and 47, such as nylon tape, secured to the inside of the upholstery material by stitches 48 and 49, respectively. The tapes 46 and 47 are positioned along the midsection of the material and up one side of the leg of the Y. The tape 46 is spaced a short distance from the edge of the material so that when the material is folded in a back-to-back relation, as shown in FIGS. 5 to 7, the nylon tapes 46 and 47 are positioned adjacent the folded sections of the material. Stitches 51 connect the adjacent outside edges of the material.

Referring to FIG. 8, the loop 34 comprises a sheet of upholstery material 52 positioned about reinforcing tape or webbing material 53. The opposite ends of the material 52 are positioned in an overlapped relation and are secured together with the tape 53 by stitches 54.

In the construction of the patient arm support 11 after the tapes 46 and 47 are stitched to the blank material as shown in FIG. 4, the material is folded in an overlapped relation along the center line thereof. The opposite sides of the blank are connected together by stitches 51. The upper end section of the arm member 27 is then folded along the fold lines 57 and 58 thereby forming the upright sides 39 and 41 as shown in FIG. 7. Stitches 42 secure this section to the inside of the side strip 32 of the cap member 26. The arm member 28 is attached in a similar manner to the opposite side of the cap member 26.

In the assembly of the patient arm support 11 on the dental chair 10 the cap member 26 is fitted on the semicircular head end 16 of the back rest 14 with the arm members 28 and 27 projecting forwardly and over the forward ends 19 and 21 of the arms 17 and 18. The loops 34 and 36 are positioned about the forward ends 19 and 21 so that the forward end sections 44a and 44 of the arm members 28 and 27 project downwardly and under the forward ends 19 and 21 of the arms 17 and 18, respectively.

In use, when the back rest 14 of the chair 10 is in an upright position as shown in FIG. 1 the arm members 28 and 27 are positioned on top of the chair arms 17 and 18 and generally follow the contour of the back rest 14. Thus, the arm members 27 and 28 have a minimum of interference with a patient entering or leaving the chair 10.

The patient is moved to a reclined position by pivoting the back rest unit 14 rearwardly with respect to the seat and leg unit 12. The arm members 17 and 18 being connected to the seat and leg unit 12 by the upright support 24 pivot with respect to the back rest unit 14 thereby increasing the distance between the forward ends 19 and 21 of the arms 17 and 18 and the head section 16 of the back rest unit 14. This relative movement places the arm members 27 and 28 under tension and in a substantially straight line position. In this position the midsections 43 and 43a of the arm members have a slight concave contour forming troughs for receiving the arms of the patient. Thus the arm members 27 and 28 provide additional support for the arms and shoulders of the patient and allow the doctor to move in closer to his field of operation without body contact with the patient.

Before the patient leaves the chair the back rest unit 14 is moved back to the upright position as shown in FIG. 1. This relaxes the tension on the arm members 28 and 27 causing them to fall back into engagement with the chair arms 17 and 18. With the raising of the chair arm 17 the patient is free to move out from the side of the chair.

In summary the patient arm support 11 is usable with a chair having a seat unit and a back unit pivotally secured to the seat unit and movable to an upright position and a reclined position and arms extended forwardly from the back section and positioned adjacent the opposite sides of the seat section. The patient arm support 11 comprises a cap member 26 positionable over the top end of the back section and a pair of flexible arm members 27 and 28 secured to the cap member 26 and extended downwardly therefrom and attachable to the arms of the chair. The flexible arm members 27 and 28 thus are pendently suspended between the arms of the chair and the upper end of the back rest and function as supports or rests for the arms of a patient seated in the chair.

While there have been shown, described, and pointed out the fundamental novel features of the invention, it is to be understood that various omissions, substitutions, changes in form, and details of the apparatus illustrated may be made by those skilled in the art without departing from the spirit of the invention. This invention is to be limited only as indicated by the scope of the following claims.

I claim:

1. Arm support apparatus for a chair having a seat unit, a back rest unit having a head end and a bottom end pivotally secured to the seat unit and movable to an upright position and a reclined position, and arms pivotally mounted on the back rest unit and extended forwardly therefrom adjacent opposite sides of the seat unit comprising:

(a) a cap member having opposite sides, said cap member being positionable over the head end of the back rest unit, (b) a pair of flexible arm members, one end of one arm member positionable adjacent and secured to one of the sides of the cap member and the corresponding end of the other arm member positionable adjacent and secured to the other side of the cap member, and (c) means secured to the opposite ends of the arm members for attaching said members to the forward ends of the chair arms whereby when the back rest unit is in the reclined position the arm members provide rests for the arms of a person seated in the chair.

2. Arm support apparatus for a chair having a seat unit, a back unit pivotally secured to the seat unit and movable to upright and reclined positions, and arms positioned adjacent the sides of the seat unit and projected forwardly from the back unit comprising:

(a) a cap member having opposite sides, said cap member being positionable over the upper portion of the back unit, and (b) arm means secured at one end thereof to the opposite sides of the cap member with the opposite end of the arm means being attachable to the adjacent arm of the chair for providing an arm rest between the back unit of the chair and said adjacent arm thereof when the back unit is in the reclined position.

3. The arm support apparatus defined in claim 2 wherein:

(a) said one end of the arm means is longitudinally folded to form upright sides which are secured to the opposite side of the cap member.

4. Arm support apparatus for a chair having a seat unit, a back unit pivotally secured to the seat unit for movement to upright and reclined positions, and a support member projected upwardly from a side of the seat unit comprising:

(a) a cap member having opposite sides, said cap member being positionable over the upper portion of the back unit, (b) a flexible arm member having one end thereof secured to one side of the cap member, and (c) means connected to the opposite end of the arm member and attachable to the upright support member whereby the arm member forms a rest for one of the arms of a person seated in the chair.

5. The arm support apparatus defined in claim 4 wherein:

(a) said one end of the arm member is longitudinally folded to form a sling for receiving a person's arm.

6. Arm support apparatus for a chair having a seat unit, a back unit pivotally secured to the seat unit for movement to upright and reclined positions, and arm rests positioned adjacent the sides of the seat unit and projected forwardly from the back unit comprising:

(a) a cap member having opposite sides, said cap member being positionable over the upper portion of the back unit, (b) a pair of flexible arm members, each arm member having one end thereof secured to one of the sides of the cap member with the opposite end of each arm member attachable to the forward end of an arm rest, and (c) said arm members movable toward a straight line position on movement of said back unit toward the reclined position therefor to provide a continuous arm support from a side of said cap member to the forward end of an arm rest.

*7. Arm support apparatus for a chair having a seat unit, a back rest unit having a head end and a bottom end pivotally secured to the seat unit for movement to an upright position and a reclined position relative thereto, and a pair of chair arms pivotally mounted on the back rest unit and extended forwardly to opposite sides of the seat unit comprising:*

*(a) a pair of flexible arm members corresponding to said chair arms,*

*(b) means for mounting on the upper end portion of the backrest and for mounting one end of one arm member closely adjacent to one of the sides of the upper end portions of the back rest unit and the corresponding end of the other arm member closely adjacent to the other side of the upper end portion of the back rest unit, and*

*(c) means secured to the opposite ends of the arm members for attaching said opposite ends to the forward ends of corresponding ones of said chair arms, each of said arm members having mid-sections of a generally trough shape in transverse section, and having a length greater than the linear distance between the connected ends thereof when the back rest unit is in the upright position therefor, whereby the arm members provide rests for receiving the arms of a person seated in the chair at all pivotally moved positions of said back rest unit relative to said seat unit.*

*8. Arm support apparatus for a chair having a seat unit, a back unit pivotally secured to the seat unit for movement relative thereto to upright and reclined positions, and a support member projected upwardly from a side of the seat unit comprising:*

*(a) a flexible arm member, means for mounting on the upper end portion of the backrest and for mounting one end of said arm member closely adjacent to the upper end portion of the back unit, and*

*(b) means connected to the opposite end of the arm member and attachable to the upright support member said arm member having a mid-section of a generally trough shape in transverse section, and having a length greater than the linear distance between the connected ends thereof when the back unit is in the upright position therefor, whereby the arm member forms a rest for receiving one of the arms of a person seated in the chair at all pivotally moved positions of said back unit relative to said seat unit.*

References Cited

The following references, cited by the Examiner, are of record in the patented file of this patent or the original patent.

UNITED STATES PATENTS

| | | | |
|---|---|---|---|
| 1,491,918 | 4/1924 | Nolan | 297—421 X |
| 1,579,585 | 4/1926 | Wieder et al. | 297—394 |
| 1,843,564 | 2/1932 | Koken | 297—421 X |
| 1,933,372 | 10/1933 | Fisher | 297—218 |
| 2,658,555 | 11/1953 | Barker | 297—421 X |
| 2,699,200 | 1/1955 | Lingle | 297—421 X |
| 2,713,890 | 7/1955 | Mack | 297—441 |
| 2,919,746 | 1/1960 | Fidel | 297—418 |
| 3,017,220 | 1/1962 | Chernivsky | 297—441 |

CASMIR A. NUNBERG, *Primary Examiner.*

FRANK B. SHERRY, *Examiner.*